US011208357B2

(12) United States Patent
Ishida et al.

(10) Patent No.: US 11,208,357 B2
(45) Date of Patent: Dec. 28, 2021

(54) METHOD FOR PRODUCING SILICON CARBIDE SINTERED BODY

(71) Applicant: NGK INSULATORS, LTD., Nagoya (JP)

(72) Inventors: Hiroki Ishida, Nagoya (JP); Hironori Takahashi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 372 days.

(21) Appl. No.: 15/938,223

(22) Filed: Mar. 28, 2018

(65) Prior Publication Data
US 2018/0282227 A1 Oct. 4, 2018

(30) Foreign Application Priority Data
Mar. 30, 2017 (JP) .............................. JP2017-068665

(51) Int. Cl.
C04B 35/565 (2006.01)
C04B 35/64 (2006.01)
C04B 35/638 (2006.01)
C04B 41/50 (2006.01)

(52) U.S. Cl.
CPC .......... *C04B 35/565* (2013.01); *C04B 35/638* (2013.01); *C04B 35/64* (2013.01); *C04B 41/5096* (2013.01); C04B 2235/3826 (2013.01); C04B 2235/424 (2013.01); C04B 2235/425 (2013.01); C04B 2235/428 (2013.01); C04B 2235/48 (2013.01); C04B 2235/5436 (2013.01); C04B 2235/606 (2013.01); C04B 2235/6581 (2013.01); C04B 2235/721 (2013.01); C04B 2235/77 (2013.01); C04B 2235/9615 (2013.01)

(58) Field of Classification Search
CPC .... C04B 35/565; C04B 35/64; C04B 41/5096
See application file for complete search history.

(56) References Cited

U.S. PATENT DOCUMENTS

| 3,951,587 A | 4/1976 | Alliegro et al. | |
| 5,486,331 A * | 1/1996 | Adachi | C04B 35/632 264/344 |
| 7,104,177 B1 * | 9/2006 | Aghajanian | F41H 5/0428 428/911 |
| 8,128,861 B1 * | 3/2012 | Aghajanian | C04B 35/563 264/682 |
| 9,321,189 B1 * | 4/2016 | Yamayose | C04B 38/0006 |
| 2005/0255335 A1 * | 11/2005 | Suyama | C04B 35/565 428/698 |
| 2010/0144522 A1 * | 6/2010 | Bayer | B01J 35/04 502/439 |
| 2011/0237431 A1 * | 9/2011 | Ambrosini | C04B 28/24 502/439 |
| 2012/0165179 A1 * | 6/2012 | Reilly | C04B 41/009 501/88 |
| 2016/0083300 A1 * | 3/2016 | Ide | C04B 35/64 428/448 |
| 2020/0392047 A1 * | 12/2020 | Onogi | C04B 35/64 |

FOREIGN PATENT DOCUMENTS

| JP | S54-010825 B2 | 5/1979 | |
| JP | S56-129684 A1 | 10/1981 | |
| JP | S-6252165 A * | 2/1985 | B01F 17/38 |
| JP | S61-122165 A | 6/1986 | |
| JP | S62-52165 A | 3/1987 | |
| JP | 2000-103677 A1 | 4/2000 | |
| JP | 2004-035279 A | 2/2004 | |

OTHER PUBLICATIONS

Boccaccini, Aldo R., and Paul A. Trusty. "In Situ Characterization of the Shrinkage Behavior of Ceramic Powder Compacts during Sintering by Using Heating Microscopy." Materials Characterization, vol. 41, No. 4, 1998, pp. 109-121., doi:10.1016/s1044-5803(98) 00025-4. (Year: 1998).*

Tatami, Junichi, et al. "Control of Shrinkage during Sintering of Alumina Ceramics Based on Master Sintering Curve Theory." Key Engineering Materials, vol. 317-318, 2006, pp. 11-14., doi:10.4028/www.scientific.net/kem.317-318.11. (Year: 2006).*

Diantonio, C.b., and K.g. Ewsuk. "Master Sintering Curve and its Application in Sintering of Electronic Ceramics." Sintering of Advanced Materials, 2010, pp. 130-161., doi:10.1533/9781845699949.1.130. (Year: 2010).*

JPS6252165A (Akutsu) Feb. 1985 (online machine translation), [Retrieved on Dec. 9, 2020], Retrieved from: Espacenet (Year: 1985).*

"Monolith (Catalyst Support)." Wikipedia, Wikimedia Foundation, Oct. 2, 2015, web.archive.org/web/20151002032347/en.wikipedia.org/wiki/Monolith_(catalyst_support). (Year: 2015).*

"Kneading." Wikipedia, Wikimedia Foundation, Feb. 9, 2017, web.archive.org/web/20170209142120/en.wikipedia.org/wiki/Kneading. (Year: 2017).*

"Glossary of Pottery Terms." Wikipedia, Wikimedia Foundation, Dec. 28, 2016, web.archive.org/web/20161228212617if_/en.wikipedia.org/wiki/Glossary_of_pottery_terms#W. (Year: 2016).*

(Continued)

Primary Examiner — Alison L Hindenlang
Assistant Examiner — Andrés E. Behrens, Jr.
(74) Attorney, Agent, or Firm — Burr & Brown, PLLC

(57) ABSTRACT

A method for producing a silicon carbide sintered body, comprising adding water to a raw material mixture containing silicon carbide powder, at least one binder, and optionally at least one carbon source other than the silicon carbide and the at least one binder, and subjecting the raw material mixture to kneading, molding, and drying in this order, to obtain a dried body; heating the dried body to remove organic substances from the dried body to obtain a degreased body; and firing the degreased body in an inert atmosphere to obtain a silicon carbide sintered body. The method comprises controlling an expansion/shrinkage rate of the sintered body by adjusting at least one of (1) an amount of the at least one carbon source in the raw material mixture, (2) an amount of the at least one binder in the raw material mixture, and (3) a degreasing rate.

15 Claims, No Drawings

(56) References Cited

OTHER PUBLICATIONS

Japanese Office Action (with English translation), Japanese Application No. 2017-068665 dated Oct. 20, 2020 (9 pages).

* cited by examiner

METHOD FOR PRODUCING SILICON CARBIDE SINTERED BODY

BACKGROUND OF THE INVENTION

1. Field of the Invention

The present invention relates to a method for producing a silicon carbide sintered body. More particularly, the present invention relates to a silicon carbide sintered body having a columnar honeycomb structure.

2. Description of Related Art

Silicon carbide based materials, particularly silicon-impregnated silicon carbide based materials are known as materials having high thermal conductivity, low thermal expansion, high strength, heat resistance and oxidation resistance, and conventionally used as heat exchange members, heat sinks, members for semiconductor devices, refractories, filters for purifying an exhaust gas, and the like.

Japanese Patent Publication No. S54-10825 B (Patent Document 1) describes a method for producing a diffusion furnace component configured of highly concentrated sintered silicon carbide rendered gas-impervious by impregnation with silicon metal. The patent document discloses that a unfired silicon carbide formed body is dried, after which it is fired at 2250° C. for 10 minutes. It also discloses that the silicon carbide formed body is then subjected to further firing to introduce silicon into the sintered silicon carbide structure, by contacting the sintered silicon carbide with silicon at a temperature of about 2150° C. in a non-oxidizing atmosphere for 10 minutes.

Japanese Patent Application Publication No. 2000-103677 A (Patent Document 2) describes a method for producing a silicon-impregnated silicon carbide material for semiconductor heat treatment, comprising mixing 50 to 75 parts by weight of first silicon carbide powder having a mean particle diameter of from 15 to 35 μm, 25 to 50 parts by weight of second silicon carbide powder having a mean particle diameter of from 0.5 to 2.0 μm and 3 to 8 parts by weight (outer percentage) of carbonaceous powder having a mean particle size of from 0.01 to 0.1 μm; adding an organic binder to the mixture and molding it; firing the molded product at 1800 to 2300° C.; and then impregnating the fired molded product with silicon. It discloses that according to the producing method, it is possible to produce a semiconductor wafer boat comprised of high strength silicon-impregnated silicon carbide material having a bending strength of from 450 to 600 MPa.

Japanese Patent Application Publication No. 56-129684 A (Patent Document 3) discloses that a silicon carbide formed body containing free carbon is impregnated with molten silicon by a heat treatment. Further, Patent Document 3 discloses that the processing time of impregnation with silicon is adjusted by including 1% or more of free carbon and a non-impregnated portion is formed in a layered or dispersed state.

CITATION LIST

Patent Document 1: Japanese Examined Patent Publication No. S54-10825 B
Patent Document 2: Japanese Patent Application Publication No. 2000-103677 A
Patent Document 3: Japanese Patent Application Publication No. S56-129684 A

SUMMARY OF THE INVENTION

Technical Problem

The above prior art documents do not assume any application requiring high dimensional accuracy, and thus do not discuss any dimensional control of the silicon carbide sintered body. Therefore, even if a silicon carbide sintered body is produced by applying the techniques described in the above prior art documents, high-accurate dimensional control cannot be carried out. For example, there has been still room for improvement so as to adapt to the applications for which high-accurate fitting into other members are required. Therefore, conventionally, when highly accurate dimensional control has been required, dimensional adjustment by means of post-processing has been required. However, the post-processing of a dense silicon carbide sintered body causes problems that many tools and labor are required, so that the production costs are increased.

The present invention has been made to solve the problems as described above. An object of the present invention is to provide a method for producing a silicon carbide sintered body which enables more accurate dimensional control.

Solution to Problem

The present inventors have conducted intensive studies in order to solve the problems as described above, and have focused on the fact that controlling of an expansion/shrinkage rate during firing contributes to improvement of dimensional accuracy. The present inventors then found that the expansion/shrinkage rate during firing is significantly governed by (1) an amount of a carbon source(s) other than silicon carbide and a binder(s) in a raw material mixture, (2) an amount of the binder in the raw material mixture, and (3) a degreasing rate, and that the expansion/shrinkage rate can be easily controlled by adjusting them. The present invention has been completed on the basis of such findings, and is illustrated as follows:

In one aspect, the present invention provides a method for producing a silicon carbide sintered body, comprising:
a step 1 of adding water to a raw material mixture containing silicon carbide powder, at least one binder, and optionally at least one carbon source other than the silicon carbide and the at least one binder, and subjecting the raw material mixture with water to kneading, molding, and drying in this order, to obtain a dried body;
a step 2 of heating the dried body obtained in the step 1 to remove organic substances from the dried body to obtain a degreased body; and
a step 3 of firing the degreased body obtained in the step 2 in an inert atmosphere to obtain a silicon carbide sintered body,
wherein the method comprises controlling an expansion/shrinkage rate of the sintered body in the step 3 by adjusting one or two or three selected from the group consisting of (1) an amount of the at least one carbon source other than the silicon carbide and the at least one binder in the raw material mixture, (2) an amount of the at least one binder in the raw material mixture, and (3) a degreasing rate in the step 2.

In one embodiment of the method according to the present invention, the carbon concentration in the degreased body to be subjected to the step 3 is from 0.01 to 5.5% by mass.

In another embodiment of the method according to the present invention, the method comprises controlling the expansion/shrinkage rate of the sintered body in the step 3 such that V2/V1 is from 0.91 to 1.13, in which V1 represents a volume of the dried body and V2 represents a volume of the sintered body.

In yet another embodiment of the method according to the present invention, the method comprises controlling the expansion/shrinkage rate of the sintered body in the step 3 such that V2/V1 is from 0.91 to 1.00.

In yet another embodiment of the method according to the present invention, the method comprises controlling the expansion/shrinkage rate of the sintered body in the step 3 such that V2/V1 is from 1.00 to 1.13.

In yet another embodiment of the method according to the present invention, the method comprises controlling the expansion/shrinkage rate of the sintered body in the step 3 such that V2/V1 is from 0.999 to 1.001.

In yet another embodiment of the method according to the present invention, the method comprises adjusting the content of the at least one carbon source other than the silicon carbide and the at least one binder in the raw material mixture such that the content is in a range of from 0.06% by mass or more to less than 1% by mass, expressed in terms of carbon concentration.

In yet another embodiment of the method according to the present invention, the method comprises adjusting the content of the at least one carbon source other than the silicon carbide and the at least one binder in the raw material mixture such that the content is less than 0.06% by mass, expressed in terms of carbon concentration.

In yet another embodiment of the method according to the present invention, the method comprises adjusting the concentration of the at least one binder in the raw material mixture such that the concentration is in a range of from 2% by mass or more to 18% by mass or less.

In still another embodiment of the method according to the present invention, the method comprising adjusting the degreasing rate in the step 2 such that the degreasing rate is in a range of from 30 to 99%.

In yet another embodiment of the method according to the present invention, the step 2 comprises heating the dried body at a temperature ranging from 300 to 600° C.

In yet another embodiment of the method according to the present invention, the method comprises adjusting the amount of the at least one carbon source other than the silicon carbide and the at least one binder in the raw material mixture by adding one or more carbon sources selected from the group consisting of carbon black, pyrolytic graphite, expanded graphite, expandable graphite, and phenol resins.

In still another embodiment of the method according to the present invention, the step 1 comprises extrusion-molding the raw material mixture to obtain a columnar honeycomb formed body comprising a plurality of cells having flow paths penetrating from a first bottom surface to a second bottom surface, the plurality of cells being defined by partition walls.

In yet another embodiment of the method according to the present invention, the firing in the step 3 is carried out while contacting the degreased body with metal silicon.

In yet another embodiment of the method according to the present invention, the mean particle diameter of the at least one carbon source other than the silicon carbide and the at least one binder is more than 0.1 μm and 100 μm or less.

Advantageous Effects of Invention

According to the present invention, it is possible to control the expansion/shrinkage rate during the firing, to enhance dimensional accuracy of the silicon carbide sintered body, and to reduce variation of dimensions (an outer diameter, roundness, perpendicularity, and the like, in the case of a cylindrical shape). Thus, for example, even if the silicon carbide sintered body is adapted to applications for which the sintered body fits into other members with high accuracy, the post-processing after firing can be omitted or reduced.

Also, the suppression of the expansion during firing can prevent warping and cracking after firing. The suppression of the expansion during firing results in a dense sintered body with less voids, and thus can provide an advantage that the amount of silicon used can be reduced when impregnating the sintered body with Si. Further, the shrinkage during firing can increase the density of the sintered body and can improve the strength and thermal conductivity.

Further, by adjusting an amount of expansion during firing, the porosity can be controlled. The controlling of the porosity by the amount of expansion can reduce costs as compared with the case where the porosity is controlled by an amount of a binder.

DETAILED DESCRIPTION OF THE INVENTION (1) Step 1

In an embodiment of a method for producing a silicon carbide sintered body according to the present invention, a step 1 is carried out by adding water to a raw material mixture containing silicon carbide powder, at least one binder, and optionally at least one carbon source other than the silicon carbide and the at least one binder, and subjecting the raw material mixture with water to kneading, molding, and drying in this order, to obtain a dried body.

Non-limiting examples of silicon carbide used for the silicon carbide powder include Black-SiC and Green-SiC. Among them, Green-SiC is preferable because it has less content of impurities and allows easy dimensional control. The silicon carbide powder generally contains impurity carbon derived from pyrolytic graphite generated during the production. The concentration of impurity carbon may preferably be 1.0% by mass or less, and more preferably 0.3% by mass or less, and still more preferably 0.1% by mass or less, in terms of easy dimensional control. In the present invention, the concentration of impurity carbon in the silicon carbide powder refers to a free carbon content determined by heating a sample at 850° C. in an oxygen stream, measuring carbon dioxide (and carbon monoxide) produced by the combustion, calculating an amount of carbon dioxide from an increase in the mass of the sample after the combustion, and correcting it, according to a combustion at 850° C.-weight correction method (according to the standard JIS R 1616: 2007).

The silicon carbide particles forming the silicon carbide powder may preferably have a mean particle diameter of 1 μm or more, and more preferably 5 μm or more, and even more preferably 10 μm or more, in terms of increasing filling density of the raw material mixture. The mean particle diameter of the silicon carbide particles forming the silicon carbide powder may preferably be 1000 μm or less, and more preferably 500 μm or less, and still more preferably 100 μm or less, in terms of improving moldability. In the present invention, the mean particle diameter of the silicon carbide particles refers to an arithmetic mean diameter on volume basis when frequency distribution of the particle size is measured by a laser diffraction method.

The concentration of the silicon carbide powder in the raw material mixture may preferably be 50% by mass or more, and more preferably 60% by mass or more, and even more preferably 70% by mass or more, in terms of increasing strength of the sintered body. Further, the concentration of the silicon carbide powder in the raw material mixture may preferably be 98% by mass or less, and more preferably 96% by mass or less, and even more preferably 94% by mass or less, in terms of increasing an ability to retain the shape of the formed body.

The metal silicon powder may be incorporated in the raw material mixture to make a composite material of silicon and silicon carbide. When incorporating the metal silicon powder, the metal silicon powder may be preferably incorporated in an amount of 10% by mass or more, and more preferably 15% by mass or more, and still more preferably 20% by mass or more, based on the total mass of the silicon carbide powder and the metal silicon powder, because the mechanical strength can be significantly increased. Further, when incorporating the metal silicon powder, the metal silicon powder may be preferably incorporated in an amount of 40% by mass or less, and more preferably 35% by mass or less, and still more preferably 30% by mass or less, based on the total mass of the silicon carbide powder and the metal silicon powder, in terms of increasing the ability to retain the shape during firing.

The proportion of water to be added to the raw material mixture may preferably be 5% by mass or more, and more preferably 7.5% by mass or more, and even more preferably 10% by mass or more, based on the mass of the raw material mixture, in order to enable kneading. Further, the proportion of water to be added to the raw material mixture may preferably be 40% by mass or less, and more preferably 35% by mass or less, and still more preferably 30% by mass or less, based on the mass of the raw material mixture, in order to increase the ability to retain the shape of the formed body.

Non-limiting examples of the binder include methyl cellulose, hydroxypropyl methyl cellulose, hydroxypropoxyl cellulose, hydroxyethyl cellulose, carboxymethyl cellulose, polyvinyl alcohol, and the like. Among them, methyl cellulose may be preferably used in combination with hydroxypropoxyl cellulose, in terms of decreased drying shrinkage and easy dimensional control.

Since the binder is an organic substance and serves as a carbon source, an expansion/shrinkage rate in a step 3 as described below varies depending on the amount of the binder. Therefore, by adjusting of the amount of the binder, the expansion/shrinkage rate of the sintered body in the step 3 as described below can be controlled. The concentration of the binder in the raw material mixture may preferably be 2% by mass or more, and more preferably 4% by mass or more, and even more preferably 6% by mass or more, for the reason of improving the ability to retain the shape of the formed body. The concentration of the binder in the raw material mixture may preferably be 18% by mass or less, and more preferably 14% by mass or less, and further more preferably 12% by mass or less, in terms of easy molding.

The at least one carbon source other than the silicon carbide and the at least one binder refers to at least one carbon source that does not form either silicon carbide or the binder. The at least one carbon source other than silicon carbide and the binder may or may not be contained in the raw material mixture, but a trace amount of carbon source (e.g., pyrolytic graphite generated during the production of silicon carbide) is generally present as impurity in the raw material such as the silicon carbide powder. Further, the at least one carbon source other than the silicon carbide and the at least one binder may be intentionally incorporated. In this case, the at least one carbon source to be incorporated in the raw material mixture includes, but is not limited to, carbon materials such as carbon black, pyrolytic graphite, expanded graphite, expandable graphite and, as well as resin materials such as phenolic resins. One of them may be incorporated, or two or more of them may be incorporated. Among those, pyrolytic graphite may be preferred, in terms of easy dimensional control. The at least one carbon source other than the silicon carbide and the at least one binder may preferably be provided in the form of powder. The mean particle diameter of the carbon source particles forming the powder may preferably be more than 0.1 µm, and more preferably 1 µm or more, and more preferably 5 µm or more, in terms of easy dimensional control. The mean particle diameter of the carbon source particles forming the powder may preferably be 100 µm or less, and more preferably 75 µm or less, and more preferably 50 µm or less, in terms of easy molding. In the present invention, the mean particle diameter of the carbon source particles refers to an arithmetic mean diameter on volume basis when the frequency distribution of the particle size is measured by the laser diffraction method.

The prior arts did not sufficiently consider the control of the carbon source as impurity. However, it is important to recognize and control the content of the carbon source at the impurity level in order to perform higher accurate dimensional control. In fact, even if the carbon concentration in the dried body differs by only 0.1% by mass, a significant volume change can be seen before and after firing. For example, when a silicon carbide based honeycomb dried body having an outer diameter of about 55 mm is subjected to Si impregnation firing, the outer diameter can be changed by 0.1 mm or more before and after firing, only by a difference of 0.1% by mass in the carbon concentration. The error of 0.1 mm in the outer diameter is a significant value for applications requiring high accurate fitting.

The impurity carbon in the raw material mixture mainly originates from the silicon carbide powder. The impurity carbon in the silicon carbide powder can be reduced by a heat treatment.

By adjusting the amount of the at least one carbon source other than the silicon carbide and the at least one binder, the expansion/shrinkage rate of the sintered body in the step 3 as described below can be controlled. In one embodiment, the production method according to the present invention include adjusting the content of the at least one carbon source other than the silicon carbide and the at least one binder in the raw material mixture such that the content is in a range of 0.06% by mass or more to less than 1% by mass, expressed in terms of carbon concentration. When the content of the at least one carbon source other than the silicon carbide and the at least one binder in the raw material mixture is in the range of 0.06% by mass or more to less than 1% by mass expressed in terms of carbon concentration, the volume of the dried body will tend to expand, although it depends on the amount of the binder and the degreasing rate. In another embodiment, the production method according to the present invention includes adjusting the content of the at least one carbon source other than the silicon carbide and the at least one binder in the raw material mixture such that the content is less than 0.06% by mass, expressed in terms of carbon concentration. When the content of the at least one carbon source other than the silicon carbide and the at least one binder in the raw material mixture is less than 0.06% by mass expressed in terms of carbon concentration, the volume of the dried body will tend to shrink by firing, although it depends on the amount of the binder and the degreasing rate. In another embodiment, the production method according to the present invention includes adjusting the content of the at least one carbon source other than the silicon carbide and the at least one binder in the raw material mixture is in a range of from 0.04% by mass or more to 0.08% by mass or less, expressed in terms of carbon concentration. When the content of the at least one carbon source other than the silicon carbide and the at least one binder in the raw material mixture is in the range of from 0.04% by mass or more to 0.08% by mass or less expressed in terms of carbon concentration, the volume of the dried body will tend to hardly change, although it depends on the amount of the binder and the degreasing rate.

In the present invention, the content of the at least one carbon source other than the silicon carbide and the at least one binder in the raw material mixture is calculated from the concentration of the impurity carbon in the silicon carbide powder, and the amounts of the binder and the phenol resin or the like as a carbon source incorporated during preparation of the raw material mixture.

After adding water to the raw material mixture and kneading them to form a green body, the green body can be molded into a desired shape by various molding methods. The molding method includes, but not limited to, press molding, extrusion molding, injection molding, and tape molding.

For example, when producing a honeycomb formed body using the extrusion molding, the step 1 includes extrusion-molding the raw material mixture to obtain a columnar honeycomb molded body in which a plurality of cells having flow paths penetrating from a first bottom surface to a second bottom surface are defined by partition walls. In the extrusion molding, a die having a desired overall shape, cell shape, partition wall thickness, cell density and the like can be used. The undried formed body thus obtained is dried to remove moisture. The drying can be carried out, for example, by applying hot air at about 120 to 160° C. to the formed body. It is desirable to note that the drying should be carried out such that organic substances are not decomposed.

The shape of each cell in the cross section orthogonal to the flow path direction of the cells includes, but not limited to, preferably a quadrangle, a hexagon, an octagon, or a combination thereof. Among them, square and hexagon shapes may be preferable. Such a cell shape will reduce the pressure loss when the gas flows through the honeycomb sintered body.

The shape of the honeycomb sintered body may be, for example, a columnar shape with circular bottoms (cylindrical shape), a columnar shape with oval bottoms, a columnar shape with polygonal bottoms (quadrangle, pentagon, hexagon, heptagon and octagon shapes, etc.), or the like. For example, when the honeycomb sintered body is cylindrical, the honeycomb sintered body may have a diameter of from 10 mm to 500 mm, and typically from 20 mm to 300 mm. The length (height) of the cells of the honeycomb sintered body in the flow path direction may be, for example, from 5 to 1000 mm, and typically from 10 to 500 mm.

(2) Step 2

Although the binder is necessary during molding, it is finally unnecessary. Therefore, the binder is removed before firing. According to one embodiment of the method for producing the silicon carbide sintered body according to the present invention, a step 2 is carried out in which organic substances such as the at least one binder is heated and removed from the dried body obtained in the step 1 to obtain a degreased body. The step 2 may also be called a degreasing step. The amount of residual organic substances varies depending on the degreasing rate in the step 2, and the expansion/shrinkage rate in the step 3 as described below varies depending on the amount of the residual organic substances.

The heating temperature of the dried body in the step 2 may preferably be 300° C. or higher, and more preferably 350° C. or higher, and still more preferably 400° C. or higher, in terms of easy burning of the binder. The heating temperature of the dried body in the step 2 may be preferably 600° C. or lower, and more preferably 550° C. or lower, and still more preferably 500° C. or lower, in order to reduce the production cost during the degreasing.

The heating time of the dried body at the heating temperature as described above may preferably be 1 hour or more, and more preferably 2 hours or more, and still more preferably 3 hours or more, in terms of easy burning of the binder. The heating time of the dried body at the heating temperature as described above may preferably be 10 hours or less, and more preferably 8 hours or less, and even more preferably 6 hours or less, in order to reduce the production cost during the degreasing.

The step 2 may be carried out, for example in the atmosphere, an inert atmosphere, a reduced pressure atmosphere. Among them, the inert and reduced pressure atmosphere may be preferred, because they can prevent insufficient sintering due to oxidation of the raw materials and easily reduce oxides contained in the raw materials.

The degreasing rate in the step 2 may preferably be 30% or more, and more preferably 50% or more, and still more preferably 70% or more, in terms of easy dimensional control. Further, it may preferably be 99% or less, and more preferably 97% or less, and still more preferably 95% or less, because an excessive degree of degreasing will make it difficult to maintain the strength after the degreasing. In the present invention, the degreasing rate is defined as a ratio of the weight of the organic substances removed in the step 2 to the weight of the organic substances in the dried body before carrying out the step 2. In the present invention, the weight of the organic substances in the dried body before carrying out the step 2 is calculated from the mixing amount of the organic substances (the binder and the resin material such as the phenol resin as the carbon source incorporated in the raw material mixture) when preparing the raw material mixture. In the step 2, it is considered that only the organic substances are removed, and the reduced weight of the dried body in the step 2 is regarded as the weight of the organic substances removed in the step 2.

(3) Step 3

In one embodiment, the method for producing the silicon carbide sintered body according to the present invention carries out a step 3 of firing the degreased body obtained in the step 2 in an inert atmosphere to obtain a silicon carbide sintered body. The firing method includes, but is not limited to, reaction sintering, recrystallization sintering, Si impregnation under reduced pressure, Si impregnation under normal pressure and Si bond SiC. The reaction sintering refers to a firing method of impregnating a formed body composed of SiC and C with molten Si and obtaining SiC by reaction of C with Si. The recrystallization sintering refers to a firing method of sintering SiC particles molded with high density at an elevated temperature of 2000° C. or higher. The Si impregnation under reduced pressure refers to a firing method of performing impregnation with metal silicon under a reduced pressure. The Si impregnation under normal pressure refers to a firing method of performing impregnation with metal silicon under normal pressure. The Si bond SiC refers to a firing method of firing a raw material mixture composed of SiC and Si to obtain a sintered body having a structure in which SiC is held by Si.

The removal of the organic substances may create gaps in the degreased body. In such a case, it is useful to carry out the Si impregnation under reduced pressure or Si impregnation under normal pressure in which the degreased body is fired while contacting it with metal silicon to melt the metal silicon and impregnate the gaps with Si, because the Si impregnated type silicon carbide sintered body can have improved mechanical strength and thermal conductivity.

The porosity of the silicon carbide sintered body when performing impregnation with Si may preferably be 5% or less, and more preferably 3% or less, and still more preferably 1% or less, for the reason of increasing the mechanical strength and thermal conductivity. In the present invention, the porosity refers to a value measured by the Archimedes method.

The reason why the firing is carried out in the inert atmosphere is to prevent insufficient sintering due to oxidation and to easily reduce oxides contained in the raw material. The inert atmosphere includes a nitrogen gas atmosphere, a rare gas atmosphere such as argon, or a mixed gas atmosphere in which these gases are mixed.

In order to prevent insufficient sintering due to oxidation, one preferred firing method is carried out under a reduced pressure. More particularly, it may be preferably carried out under a reduced pressure of from 1 to 500 Pa (absolute pressure), and more preferably under a reduced pressure of from 1 to 100 Pa (absolute pressure).

The firing temperature may preferably be 1350° C. or higher, and more preferably 1400° C. or higher, and still more preferably 1450° C. or higher, in order to sufficiently perform sintering. The firing temperature may preferably be 2200° C. or lower, and more preferably 1800° C. or lower, and still more preferably 1600° C. or lower, in order to reduce the production cost during the firing.

In order to sufficiently carrying out the sintering, the heating time of the degreased body at the firing temperature as described above may preferably be 0.25 hours or more, and more preferably 0.5 hour or more, and even more preferably 0.75 hour or more. In order to reduce the production cost during the firing, the heating time of the degreased body at the firing temperature as described above may preferably be 5 hours or less, and more preferably 4 hours or less, and still more preferably 3 hours or less.

A firing furnace that may be used includes, but not particularly limited to, an electric furnace, a gas furnace and the like.

The carbon concentration in the degreased body immediately before the step 3 affects the expansion/shrinkage rate of the sintered body in the step 3. When the carbon concentration in the degreased body is low, the degreased body will tend to shrink during the firing. As the carbon concentration is increased, the shrinkage will be suppressed and eventually change from shrinkage to expansion. As the carbon concentration is further increased, the amount of expansion will be increased.

The relationship between the carbon content and the volume expansion can be explained by the following mechanism. On the surface of the silicon carbide based dried body, an oxide film of $SiO_2$ is formed due to oxidation of the surfaces of the SiC particles during synthesis of SiC, and a SiO gas derived from $SiO_2$ is generated during the firing. In the presence of carbon, the reaction: $2C+SiO \rightarrow SiC+CO$ is generated, and the volume expansion occurs when C converts to SiC. Further, in impregnation with Si, an SiO gas originating from metal silicon is further generated during the firing, so that the volume expansion tends to be increased. When a plurality of dried bodies are arranged in a furnace and fired while allowing an inert gas to flow in one direction, the SiO gas concentration on the downstream side of the inert gas will tend to be increased and the volume expansion of the dried bodies arranged on the downstream side will tend to be increased, so that after the firing, a dimensional error between the sintered bodies on the upstream side of the inert gas and the sintered bodies on the downstream side will tend to be generated.

The carbon content in the degreased body can be adjusted by (1) the amount of the at least one carbon source other than the silicon carbide and the at least one binder in the raw material mixture, (2) the amount of the at least one binder in the raw material mixture, and (3) the degreasing rate in the step 2. Therefore, by adjusting one, two or three selected from the group consisting of (1) to (3), the expansion/shrinkage rate of the sintered body in the step 3 can be controlled.

In one embodiment of the method for producing the silicon carbide sintered body according to the present invention, the expansion/shrinkage rate of the sintered body in the step 3 can be controlled such that V2/V1, in which V1 represents a volume of the dried body and V2 represents a volume of the sintered body, is from 0.91 to 1.13. Depending on the size and shape of the dried body, the carbon concentration (residual carbon content) in the degreased body to be subjected to the step 3 can be adjusted to be generally a range of from 0.01 to 5.5% by mass, and typically from 0.01 to 3.5% by mass, to maintain V2/V1 within a range of from 0.91 to 1.13.

In one embodiment of the method for producing the silicon carbide sintered body according to the present invention, the expansion/shrinkage rate of the sintered body in the step 3 can be controlled such that V2/V1 is from 0.91 to 1.00. Depending on the size and shape of the dried body, the carbon concentration (residual carbon content) in the degreased body to be subjected to the step 3 can be adjusted to be generally a range of from 0.01 to 0.6% by mass, and typically from 0.01 to 0.57% by mass, to maintain V2/V1 within a range of from 0.91 to 1.00.

In one embodiment of the method for producing the silicon carbide sintered body according to the present invention, the expansion/shrinkage rate of the sintered body in the step 3 can be controlled such that V2/V1 is from 1.00 to 1.13. Depending on the size and shape of the dried body, the carbon concentration (residual carbon content) in the degreased body to be subjected to the step 3 can be adjusted to be generally a range of from 0.6 to 5.5% by mass, and typically from 0.57 to 3.5% by mass, to maintain V2/V1 within a range of from 1.00 to 1.13.

In one embodiment of the method for producing the silicon carbide sintered body according to the present invention, the expansion/shrinkage rate of the sintered body in the step 3 can be controlled such that V2/V1 is from 0.999 to 1.001. Depending on the size and shape of the dried body, the carbon concentration (residual carbon content) in the degreased body to be subjected to the step 3 can be adjusted to be generally a range of from 0.52 to 0.62% by mass, and typically from 0.54 to 0.60% by mass, to maintain V2/V1 within a range of from 0.999 to 1.001.

However, an excessively low carbon concentration (residual carbon content) in the degreased body to be subjected to the step 3 will tend to result in insufficient strength of the degreased body. Therefore, in terms of the strength, the carbon concentration may preferably be 0.1% by mass or more, and more preferably 0.5% by mass or more. Further, an excessively high carbon concentration (residual carbon content) will tend to make it difficult to control the amount of expansion. Therefore, in terms of controllability, the carbon concentration may preferably be 3% by mass or less, and more preferably 2% by mass or less, and still more preferably 0.9% by mass or less.

Each volume of the dried body and the sintered body is a value calculated based on the external dimensions. Therefore, even if spaces or voids are present inside the dried body and the sintered body, they are not deducted from the volume. The external dimensions of the dried body and sintered body can be measured by a two-dimensional dimension measuring apparatus or the like.

Further, in the present invention, the carbon concentration (residual carbon content) in the degreased body refers to a free carbon content determined by pulverizing the degreased body to obtain a powdered sample, heating the powdered sample at 850° C. in an oxygen stream, measuring carbon dioxide (and carbon monoxide) produced by the combustion, calculating an amount of carbon dioxide generated due to oxidation of silicon carbide from an increase in the mass of the sample after the combustion, and correcting it, according to a combustion at 850° C.-weight correction method (according to the standard JIS R 1616: 2007).

The silicon carbide sintered body according to the present invention can be used, for example, as a heat exchanging member, a heat sink, a member for a semiconductor device, a refractory, a filter for purifying an exhaust gas, or the like.

EXAMPLES

Hereinafter, Examples will be illustrated for better understanding of the present invention and its advantages, but the present invention is not limited to the Examples.
<1. Relationship Between Residual Carbon Amount and Expansion/Shrinkage Rate>

Test Example 1-1

(1) Preparation of Honeycomb Formed Body

As silicon carbide (SiC) powder, Green-SiC powder having a mean particle diameter of 30 μm was prepared. The amount of impurity carbon in the silicon carbide (SiC) powder was reduced by the heat treatment of the SiC powder. As a result, the carbon concentration in the silicon carbide powder was 0.01% by mass.

Methyl cellulose was prepared as a binder.

The silicon carbide powder after the heat treatment and the binder were mixed at a predetermined mass ratio to prepare a raw material mixture. The amount of the carbon source other than the silicon carbide and the binder in the raw material mixture was 0.01% by mass, expressed in terms of carbon concentration.

Water was added to the raw material mixture, and the mixture with water was kneaded and molded to obtain a honeycomb formed body. The resulting honeycomb molded body was subjected to high frequency dielectric induction heating and drying, and then dried at 120° C. for 2 hours using a hot air dryer, and optionally processed such as by cutting a predetermined amount of both bottom surfaces, to prepare a cylindrical honeycomb dried body having a diameter of 55 mm and a height of 23 mm.

The honeycomb dried body was then placed in an electric furnace, and heated at 400° C. for 5 hours under a reduced pressure and in a nitrogen atmosphere to degrease the honeycomb dried body (organic substances were removed by heating). The carbon concentration (residual carbon content) of the honeycomb degreased body after removal of the organic substances was 0.51% by mass. In this case, the degreasing rate was 92%.

The honeycomb degreased body was then placed in an electric furnace and fired by heating the honeycomb degreased body at 1500° C. for 1 hour in an argon atmosphere under a reduced pressure condition of 100 Pa (absolute pressure) while contacting the honeycomb degreased body with metal silicon (Si impregnation firing under reduced pressure). V2/V1 was 0.990, in which V1 represents a volume of the honeycomb dried body and V2 represents a volume of the sintered body.

(2) Specification of the Resulting Honeycomb Formed Body

The porosity of the honeycomb formed body after firing was measured according to the Archimedes method and found that it was 0.5%.

Test Example 1-2

In addition to the same raw materials as in Test Example 1-1, pyrolytic graphite having a mean particle diameter of 30 μm was prepared. The pyrolytic graphite, the silicon carbide powder after the heat treatment and the binder were mixed at a predetermined mass ratio to prepare a raw material mixture. The amount of the carbon source other than the silicon carbide and the binder in the raw material mixture was 0.06% by mass, expressed in terms of carbon concentration. Subsequently, water was added to the raw material mixture, and kneading, molding and drying were carried out in this order under the same conditions as in Test Example 1-1 to obtain a honeycomb dried body.

Subsequently, the organic substances were heated and removed under the same conditions as in Test Example 1-1. The carbon concentration (residual carbon content) of the honeycomb degreased body after removal of the organic substances was 0.57% by mass. In this case, the degreasing rate was 92%.

The Si impregnation firing under reduce pressure was carried out under the same conditions as in Test Example 1-1. V2/V1 was 1.000, in which V1 represents a volume of the honeycomb dried body before firing and V2 represents a volume of the sintered body.

Test Example 1-3

In addition to the same raw materials as in Test Example 1-1, pyrolytic graphite having a mean particle diameter of 30 μm was prepared. The pyrolytic graphite, the silicon carbide powder after the heat treatment and the binder were mixed at a predetermined mass ratio to prepare a raw material mixture. The amount of the carbon source other than the silicon carbide and the binder in the raw material mixture was 0.93% by mass, expressed in terms of carbon concentration. Subsequently, water was added to the raw material mixture, and kneading, molding and drying were carried out in this order under the same conditions as in Test Example 1-1 to obtain a honeycomb dried body.

Subsequently, the organic substances were heated and removed under the same conditions as in Test Example 1-1. The carbon concentration (residual carbon content) of the honeycomb degreased body after removal of the organic substances was 1.49% by mass. In this case, the degreasing rate was 92%.

The Si impregnation firing under reduce pressure was then carried out under the same conditions as in Test Example 1-1. V2/V1 was 1.038, in which V1 represents a volume of the honeycomb dried body before firing and V2 represents a volume of the sintered body.

Test Example 1-4

As silicon carbide (SiC) powder, Green-SiC powder having a mean particle diameter of 30 μm was prepared. However, the operation of reducing the amount of impurity carbon in the silicon carbide (SiC) powder was not carried out. As a result, the carbon concentration in the silicon carbide powder was 0.40% by mass.

Using the same raw materials as in Test Example 1-1 except for the silicon carbide powder, the silicon carbide powder and the binder were mixed at the same mass ratio as in Test Example 1-1 to obtain a raw material mixture. The amount of the carbon source other than the silicon carbide and the binder in the raw material mixture was 0.37% by mass, expressed in terms of carbon concentration. Subsequently, water was added to the raw material mixture, and kneading, molding and drying were carried out in this order under the same conditions as in Test Example 1-1 to obtain a honeycomb dried body.

The organic substances were then heated and removed under the same conditions as in Test Example 1-1. The carbon concentration (residual carbon content) of the honeycomb degreased body after removal of the organic substances was 0.90% by mass. In this case, the degreasing rate was 92%.

The Si impregnation firing under reduce pressure was then carried out under the same conditions as in Test Example 1-1. V2/V1 was 1.007, in which V1 represents a volume of the honeycomb dried body before firing and V2 represents a volume of the sintered body.

The results of Test Examples 1-1 to 1-4 are summarized in Table 1-1. As can be seen the results shown in Table 1-1, the adjustment of the amount of the carbon source other than the silicon carbide and the binder in the raw material mixture allows control of the shrinkage and expansion during the firing.

TABLE 1-1

|  | A (% by mass) | B (% by mass) | C (% by mass) | V2/V1 |
| --- | --- | --- | --- | --- |
| Test Example 1-1 | 0.01 | 0.01 | 0.51 | 0.990 |
| Test Example 1-2 | 0.01 | 0.06 | 0.57 | 1.000 |
| Test Example 1-3 | 0.01 | 0.93 | 1.49 | 1.038 |
| Test Example 1-4 | 0.40 | 0.37 | 0.90 | 1.007 |

A: the carbon concentration in the silicon carbide powder;
B: the amount of the carbon source other than the silicon carbide and the binder in the raw material mixture (in terms of carbon concentration);
C: the carbon concentration (residual carbon content) of the honeycomb degreased body after removal of the organic substances.

Test Example 1-5

As silicon carbide (SiC) powder, Green-SiC powder having a mean particle diameter of 30 μm was prepared. The amount of impurity carbon in the silicon carbide (SiC) powder was reduced by the heat treatment of the SiC powder. As a result, the carbon concentration in the silicon carbide powder was 0.01% by mass.

Metal silicon powder having a mean particle size of 10 μm was prepared.

Methyl cellulose was prepared as a binder.

The silicon carbide powder after the heat treatment, the metal silicon powder and the binder were mixed at a predetermined mass ratio to prepare a raw material mixture. The amount of the carbon source other than the silicon carbide and the binder in the raw material mixture was 0.01% by mass, expressed in terms of carbon concentration.

Water was added to the raw material mixture, and the mixture with water was kneaded and molded to obtain a honeycomb formed body. The resulting honeycomb formed body was subjected to high frequency dielectric induction heating and drying, and then dried at 120° C. for 2 hours using a hot air dryer, and optionally processed such as by cutting a predetermined amount of both bottom surfaces, to prepare a cylindrical honeycomb dried body having a diameter of 55 mm and a height of 23 mm.

The honeycomb dried body was then placed in an electric furnace, and heated at 400° C. for 5 hours under a reduced pressure and in a nitrogen atmosphere to degrease the honeycomb dried body (organic substances were removed by heating). The carbon concentration (residual carbon content) of the honeycomb degreased body after removal of the organic substances was 0.41% by mass. In this case, the degreasing rate was 92%.

The honeycomb degreased body was then placed in an electric furnace and fired by heating the honeycomb degreased body at 1500° C. for 1 hour in an argon atmosphere under a reduced pressure condition of 100 Pa (absolute pressure). V2/V1 was 0.910, in which V1 represents a volume of the honeycomb dried body and V2 represents a volume of the sintered body.

The results of Test Example 1-5 are shown in Table 1-2. It is considered from the results of Test Example 1-5 that when the metal silicon powder is blended in advance and impregnation with silicon is not carried out, the organic substances are scattered due to the degreasing to generate pores and allow SiC to move freely, so that the melting of silicon at an elevated temperature leads to easy shrinkage due to the wettability of silicon.

TABLE 1-2

|  | A (% by mass) | B (% by mass) | C (% by mass) | V2/V1 |
| --- | --- | --- | --- | --- |
| Test example 1-5 | 0.01 | 0.01 | 0.41 | 0.910 |

A: the carbon concentration in the silicon carbide powder;
B: the amount of the carbon source other than the silicon carbide and the binder in the raw material mixture (in terms of carbon concentration);
C: the carbon concentration (residual carbon content) of the honeycomb degreased body after removal of the organic substances.

<2. Relationship Between Degreasing Rate and Expansion/Shrinkage Rate>

Test Examples 2-1 to 2-5

After preparing a honeycomb dried body under the same conditions as in Test Examples 1-4, the degreasing rate was varied by changing the heating and removing conditions of the organic substances (Test Examples 2-1 to 2-5). The degreasing rate was varied by increasing or decreasing the time for heating and removing the organic substances. After degreasing, the Si impregnation firing under reduced pressure was carried out under the same conditions as in Test Example 1-4. Table 2 shows the relationship among the degreasing rate, the carbon concentration (residual carbon content) of the honeycomb degreased body, and V2/V1. As can be seen from the results of Table 2, the shrinkage and expansion during the firing can be controlled by adjusting the degreasing rate.

TABLE 2

|  | Degreasing Rate (%) | A (% by mass) | B (% by mass) | C (% by mass) | V2/V1 |
|---|---|---|---|---|---|
| Test Example 1-4 | 92 | 0.40 | 0.37 | 0.90 | 1.007 |
| Test Example 2-1 | 80 | 0.40 | 0.37 | 1.26 | 1.008 |
| Test Example 2-2 | 70 | 0.40 | 0.37 | 1.62 | 1.010 |
| Test Example 2-3 | 60 | 0.40 | 0.37 | 1.98 | 1.011 |
| Test Example 2-4 | 50 | 0.40 | 0.37 | 2.34 | 1.013 |
| Test Example 2-5 | 40 | 0.40 | 0.37 | 2.70 | 1.015 |

A: the carbon concentration in the silicon carbide powder;
B: the amount of the carbon source other than the silicon carbide and the binder in the raw material mixture (in terms of carbon concentration);
C: the carbon concentration (residual carbon content) of the honeycomb degreased body after removal of the organic substances.

<3. Effect of SiO Concentration on Expansion/Shrinkage Rate>

Si Impregnation Firing Under Reduced Pressure: Test Examples 3-1 to 3-6

On the basis of Test Example 1-4, the amount of the carbon source other than the silicon carbide and the binder in the raw material mixture, the amount of the binder in the raw material mixture and the degreasing rate were adjusted to prepare six types of cylindrical honeycomb degreased bodies (target external dimensions: a diameter of 55 mm×a height of 23 mm) having different carbon concentrations (residual carbon contents) after removal of the organic substances (Test Examples 3-1 to 3-6). Table 3-1 shows the carbon concentration (residual carbon content) in the honeycomb degreased body according to each test example.

The honeycomb dried bodies of each test example were arrayed and placed on a carriage in 70 rows (full length of 4 m) at equal intervals in the longitudinal direction, and fired while allowing an argon gas to flow in one direction within a batch type shuttle kiln. The firing was carried out at a heating temperature of 1500° C. for 2 hours and under a reduced pressure condition of 100 Pa (absolute pressure). Further, the firing was carried out by bringing the honeycomb dried body into contact with metal silicon (Si impregnation firing under reduced pressure). It should be noted that in the furnace during the firing, a SiO gas derived from the $SiO_2$ film on the surface of the dried body is present, and a SiO gas derived from metal silicon is also present in the case of the Si impregnation firing. The SiO gas concentration in the furnace increases as it goes to the downstream side of the argon gas.

The volume changes (V2/V1) of the honeycomb sintered bodies before and after the firing, at the first row, the 18th row, the 35th row, the 53rd row and the 70th row from the upstream side toward the downstream side in the longitudinal direction, were examined. The results of the Si impregnation firing under reduced pressure are shown in Table 3-1.

TABLE 3-1

| Si Impregnation Firing Under Reduced Pressure | Residual Carbon Content (% by mass) | V2/V1 | | | | | |
|---|---|---|---|---|---|---|---|
| | | First Row | 18th Row | 35th Row | 53rd Row | 70th Row | Max-Min |
| Test Example 3-1 | 0.60 | 1.004 | 1.004 | 1.004 | 1.004 | 1.004 | 0 |
| Test Example 3-2 | 0.70 | 1.006 | 1.006 | 1.006 | 1.006 | 1.007 | 0.001 |
| Test Example 3-3 | 0.75 | 1.007 | 1.007 | 1.007 | 1.007 | 1.008 | 0.001 |
| Test Example 3-4 | 0.80 | 1.007 | 1.008 | 1.009 | 1.011 | 1.020 | 0.013 |
| Test Example 3-5 | 0.90 | 1.007 | 1.008 | 1.013 | 1.016 | 1.027 | 0.020 |
| Test Example 3-6 | 1.50 | 1.009 | 1.012 | 1.021 | 1.030 | 1.040 | 0.031 |

Si Bond SiC Firing: Test Examples 4-1 to 4-6

On the basis of Test Examples 1-5, the amount of the carbon source other than the silicon carbide and the binder in the raw material mixture, the amount of the binder in the raw material mixture and the degreasing rate were adjusted to prepare six types of cylindrical honeycomb degreased bodies (target external dimensions: a diameter of 55 mm×a height of 23 mm) having different carbon concentrations (residual carbon contents) after removal of the organic substances (Test Examples 4-1 to 4-6). Table 3-2 shows the carbon concentration (residual carbon content) in the honeycomb degreased body according to each test example.

The honeycomb dried bodies of each test example were arrayed and placed on a carriage in 70 rows (full length of 4 m) at equal intervals in the longitudinal direction, and fired while allowing an argon gas to flow in one direction within a batch type shuttle kiln. The firing was carried out at a heating temperature of 1500° C. for 2 hours and under a reduced pressure condition of 100 Pa (absolute pressure). It should be noted that in the furnace during the firing, a SiO gas derived from the $SiO_2$ film on the surface of the dried body is present. The SiO gas concentration in the furnace increases as it goes to the downstream side of the argon gas.

The volume changes (V2/V1) of the honeycomb sintered bodies before and after the firing, at the first row, the 18th row, the 35th row, the 53rd row and the 70th row from the upstream side toward the downstream side in the longitudinal direction, were examined. The results of the Si bond SiC firing are shown in Table 3-2.

TABLE 3-2

| Si Bond SiC Firing | Residual Carbon Content (% by mass) | V2/V1 | | | | | |
|---|---|---|---|---|---|---|---|
| | | First Row | 18th Row | 35th Row | 53rd Row | 70th Row | Max-Min |
| Test Example 4-1 | 0.41 | 0.910 | 0.910 | 0.910 | 0.910 | 0.910 | 0 |
| Test Example 4-2 | 0.50 | 0.912 | 0.912 | 0.912 | 0.912 | 0.913 | 0.001 |
| Test Example 4-3 | 0.55 | 0.913 | 0.913 | 0.913 | 0.913 | 0.914 | 0.001 |
| Test Example 4-4 | 0.60 | 0.913 | 0.914 | 0.914 | 0.916 | 0.925 | 0.012 |
| Test Example 4-5 | 0.70 | 0.913 | 0.914 | 0.918 | 0.921 | 0.931 | 0.018 |
| Test Example 4-6 | 1.30 | 0.915 | 0.917 | 0.925 | 0.934 | 0.943 | 0.028 |

As can be seen from Table 3-1 and Table 3-2, the more residual carbon content of the honeycomb degreased body, the more expansion rate of the honeycomb sintered body on the downstream side, which had the higher SiO gas concentration in the furnace. In other words, it is understood that by decreasing the residual carbon amount of the honeycomb degreased body, dependency of the volume expansion on the $SiO_2$ concentration is reduced and the sintered body having improved quality stability can be thus obtained.

What is claimed is:

1. A method for producing a silicon carbide sintered body, comprising:
   a step 1 of adding water to a raw material mixture containing silicon carbide powder, at least one binder, and optionally at least one carbon source other than the silicon carbide and the at least one binder, and subjecting the raw material mixture with water to kneading, molding, and drying in this order, to obtain a dried body;
   a step 2 of heating the dried body obtained in the step 1 to remove organic substances from the dried body to obtain a degreased body; and
   a step 3 of firing the degreased body obtained in the step 2 in an inert atmosphere to obtain a silicon carbide sintered body,
   wherein the method comprises controlling an expansion rate and shrinkage rate of the sintered body in the step 3 by adjusting at least one selected from the group consisting of (1) an amount of the at least one carbon source other than the silicon carbide and the at least one binder in the raw material mixture, (2) an amount of the at least one binder in the raw material mixture, and (3) a degreasing rate in the step 2,
   wherein the carbon concentration in the degreased body to be subjected to the step 3 is from 0.01 to 5.5% by mass.

2. The method according to claim 1, wherein the method comprises controlling the expansion rate and shrinkage rate of the sintered body in the step 3 such that V2/V1 is from 0.91 to 1.13, in which V1 represents a volume of the dried body and V2 represents a volume of the sintered body.

3. The method according to claim 1, wherein the method comprises controlling the expansion rate and shrinkage rate of the sintered body in the step 3 such that V2/V1 is from 0.91 to 1.00, in which V1 represents a volume of the dried body and V2 represents a volume of the sintered body.

4. The method according to claim 1, wherein the method comprises controlling the expansion rate and shrinkage rate of the sintered body in the step 3 such that V2/V1 is from 1.00 to 1.13, in which V1 represents a volume of the dried body and V2 represents a volume of the sintered body.

5. The method according to claim 1, wherein the method comprises controlling the expansion rate and shrinkage rate of the sintered body in the step 3 such that V2/V1 is from 0.999 to 1.001, in which V1 represents a volume of the dried body and V2 represents a volume of the sintered body.

6. The method according to claim 1, wherein the method comprises adjusting the content of the at least one carbon source other than the silicon carbide and the at least one binder in the raw material mixture such that the content is in a range of from 0.06% by mass or more to less than 1% by mass, expressed in terms of carbon concentration.

7. The method according to claim 1, wherein the method comprises adjusting the content of the at least one carbon source other than the silicon carbide and the at least one binder in the raw material mixture such that the content is less than 0.06% by mass, expressed in terms of carbon concentration.

8. The method according to claim 1, wherein the method comprises adjusting the concentration of the at least one binder in the raw material mixture such that the concentration is in a range of from 2% by mass or more to 18% by mass or less.

9. The method according to claim 1, wherein the method comprising adjusting the degreasing rate in the step 2 such that the degreasing rate is in a range of from 30 to 99%.

10. The method according to claim 1, wherein the step 2 comprises heating the dried body at a temperature ranging from 300 to 600° C.

11. The method according to claim 1, wherein the method comprises adjusting the amount of the at least one carbon source other than the silicon carbide and the at least one binder in the raw material mixture by adding one or more carbon sources selected from the group consisting of carbon black, pyrolytic graphite, expanded graphite, expandable graphite, and phenol resins.

12. The method according to claim 1, wherein the step 1 comprises extrusion-molding the raw material mixture to obtain a columnar honeycomb formed body comprising a plurality of cells having flow paths penetrating from a first bottom surface to a second bottom surface, the plurality of cells being defined by partition walls.

13. The method according to claim 1, wherein the firing in the step 3 is carried out while contacting the degreased body with metal silicon.

14. The method according to claim 1, wherein the mean particle diameter of the at least one carbon source other than the silicon carbide and the at least one binder is more than 0.1 μm and 100 μm or less.

15. The method according to claim 1, wherein the carbon concentration in the degreased body to be subjected to the step 3 is from 0.01 to 3.5% by mass.

* * * * *